M. L. NIX.
COTTON CULTIVATOR.
APPLICATION FILED APR. 20, 1910.

977,534.

Patented Dec. 6, 1910.
2 SHEETS—SHEET 1.

Witnesses:
J. C. Adams
Bess Epperson

Inventor:
Manning L. Nix.
By Frank P. Shepard, Atty.

M. L. NIX.
COTTON CULTIVATOR.
APPLICATION FILED APR. 20, 1910.

977,534.

Patented Dec. 6, 1910.
2 SHEETS—SHEET 2.

Witnesses:

Inventor:
Manning L. Nix.
By Frank P. Shepard, Atty.

UNITED STATES PATENT OFFICE.

MANNING L. NIX, OF OKLAHOMA, OKLAHOMA.

COTTON-CULTIVATOR.

977,534.  Specification of Letters Patent.  Patented Dec. 6, 1910.

Application filed April 20, 1910. Serial No. 556,540.

*To all whom it may concern:*

Be it known that I, MANNING L. NIX, a citizen of the United States, residing at Oklahoma city, in the county of Oklahoma and State of Oklahoma, have invented a new and useful Cotton-Cultivator, of which the following is a specification.

The invention relates to a cotton cultivator.

The object of the present invention is to improve the construction of cotton cultivators, and to provide a simple, inexpensive and efficient machine, designed especially for barring cotton or for throwing the soil away from a row of cotton plants preparatory to cultivation.

A further object of the invention is to provide a cultivating machine of this character, equipped with a pivoted support, arranged to swing upward and downward and provided with soil-engaging devices, adapted through their engagement with the soil to maintain the pivoted support in its lowered position and prevent the same from swinging upward, thereby obviating the necessity of employing locking devices for holding the machine in the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
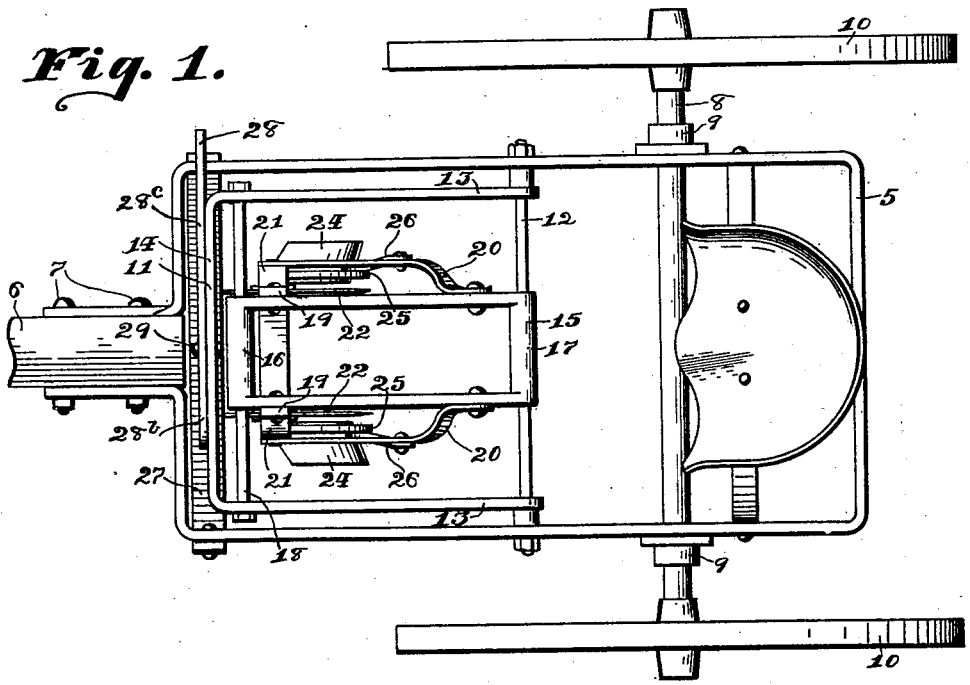
Figure 2:
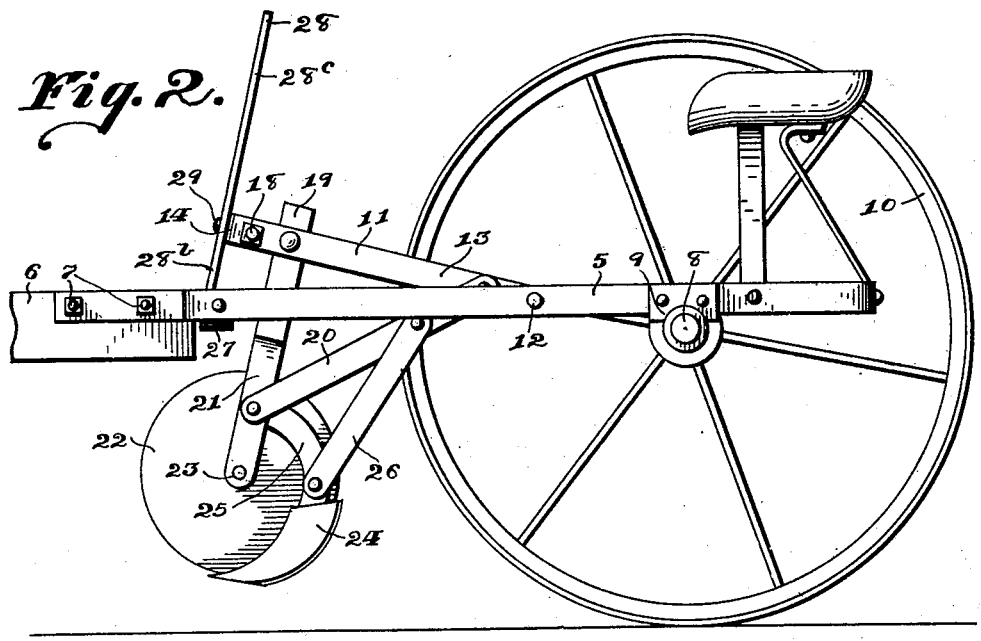
Figure 3:
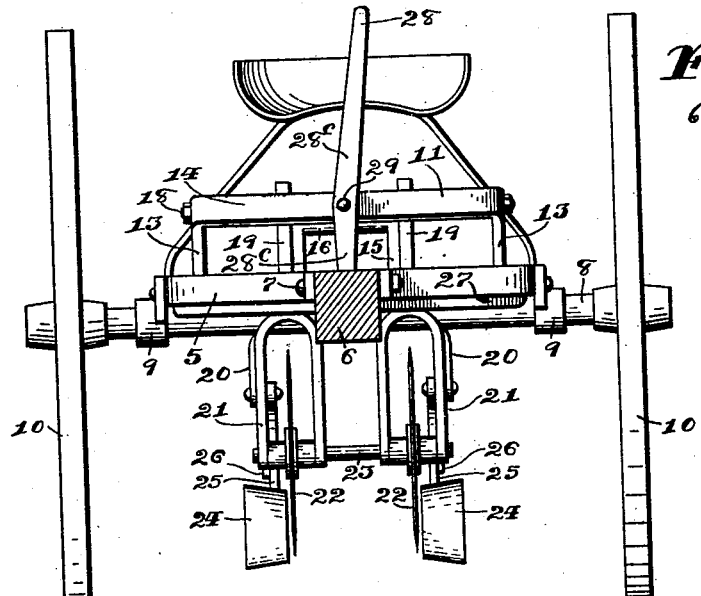
Figure 4:
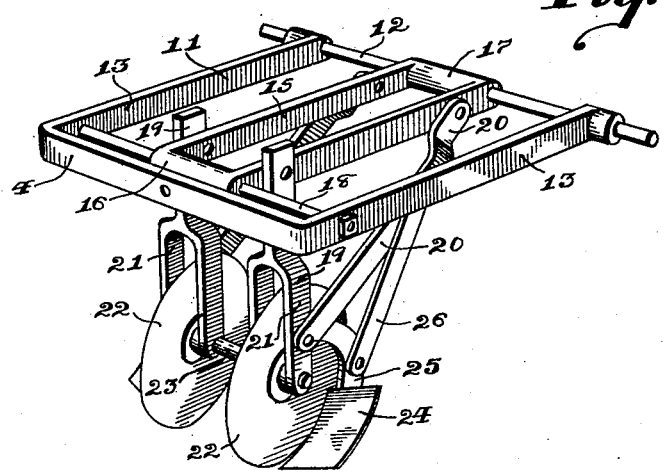

In the drawings:—Figure 1 is a plan view of a cotton cultivating machine, constructed in accordance with this invention, the pivoted support being in its lowered position. Fig. 2 is a side elevation of the same, the soil-engaging devices being elevated above the ground. Fig. 3 is a front elevation of the machine, the tongue being in section and the soil-engaging devices being elevated. Fig. 4 is a perspective view of the pivoted support and the soil-engaging devices.

Like numerals of reference designate corresponding parts in all the figures of the drawings.

In the embodiment of the invention illustrated in the accompanying drawings, the cotton cultivator is provided with a rectangular main frame 5, preferably constructed of a single piece of metal bent to form spaced parallel sides, a rear connecting transverse portion, and inwardly extending transversely disposed front portions, which have their terminals extended forwardly and secured to the side faces of a tongue or pole 6 at the rear end thereof by transverse bolts 7, piercing the tongue or pole and the said terminals of the inwardly extending front portions of the frame. The frame is supported in its rear end by a transverse shaft or axle 8, mounted in suitable bearings 9 of the sides of the frame and equipped at its ends with ground or carrying wheels 10.

Pivotally mounted within the main frame 5 is a rectangular supporting frame 11, preferably constructed of a single piece of metal and composed of spaced sides 13 and a connecting front portion 14, and connected at its rear end with the sides of the main frame by a transverse rod 12. The pivoted frame 11, which is smaller than the main frame, is arranged in spaced relation with the front and side portions of the same, and the rod 12 passes through the rear terminals of the sides of the frame 11 and through the sides of the main frame at points in advance of the shaft or axle. The pivoted frame carries a substantially rectangular support 15, extending longitudinally of the machine and preferably consisting of a casting and composed of front and rear portions 16 and 17 and integral connecting side portions, arranged in parallelism and spaced apart, as clearly shown in Figs. 1 and 4 of the drawings. The front and rear portions 16 and 17 are made tubular, and the pivot rod 12 passes through the rear tubular portion 17 and connects the rear end of the support with the pivoted frame and the main frame. The front portion of the rectangular support 15 is connected with the sides of the pivoted frame at the front portion thereof by means of a transverse rod 18, extending through the front tubular portion 16 and piercing the sides 13 of the pivoted frame. The rods 12 and 18 rigidly connect the support 15 with the pivoted frame and cause the same to swing upwardly and downwardly with the frame 11 when the latter is raised and lowered.

The rectangular support 15 carries a pair of standards 19, bolted at their upper ends to the sides of the support 15 near the front end thereof and having lower forked portions. The standards 19 are rigidly braced in angular relation with the rectangular support 15 by inclined bars or braces 20, extending upwardly and rearwardly from the outer faces of the outer sides of the forked or bifurcated lower portions of the standards and secured to the same and to the sides of the rectangular support 15 near the rear end thereof. The upper portions of the inclined bars or braces 20 are bent inwardly to arrange their upper ends against the outer faces of the sides of the said rectangular support 15. Each of the standards 19 is equipped with a cutting disk 22, revolubly mounted in the lower forked portions of the standards and supported by a transverse shaft 23, arranged in alined perforations of the standards 19, and extending across the space between the same and connecting the lower ends thereof. The disks are arranged vertically and are adapted to straddle a row of cotton plants and cut the soil at the opposite sides thereof, the soil being thrown outward away from the plants by plows 24, which are equipped with blades or shares, set at an inclination and curved from front to rear and shaped like the share and mold board of a common soil plow. The blades or shares of the plow 24 are arranged at the outer faces of the cutter disks with their inner landside edge close to and in parallelism with the said disks. The plows 24 are provided with curved standards 25, secured at their upper ends to the inner faces of the outer sides of the lower forked portions of the vertical standards 19 and braced by upwardly and rearwardly inclined bars 26. The bars 26 are secured at their lower ends to the outer faces of the curved plow beams, and their upper ends are fastened to the outer faces of the inclined bars or braces 20 at the upper portions thereof and at points between the ends of the same.

When the cutting disks 22 and the plows 24 are in their lowermost position to act upon the soil, the two frames 5 and 11 are arranged in the same horizontal plane, and the free front end of the inner pivoted frame 11 rests upon a transverse supporting bar 27, extending across the front of the frame below the front end of the pivoted frame and having its terminals bent upwardly and secured to the sides of the main frame 5 at the outer faces of the same. The inclination of the plows 24 causes them to engage the soil and force the cutting disks into the same, and their location in advance of the pivot of the frame 11 maintains them in working position and holds the said frame 11 against upward movement, and enables the front end of the same to be supported loosely upon the bar 27 of the main frame without liability of the pivoted frame being thrown upwardly. This obviates the necessity of locking the pivoted frame in its lowered position to maintain the soil-engaging devices in the ground.

The pivoted frame 11 is swung upwardly to elevate the cutting disks and plows above the ground by means of a lever 28, pivotally connected at a point intermediate of its ends to the front portion 14 of the frame 11 by a rivet 29 and having a short arm 28$^b$, adapted to rest upon the bar 27 to support the front end of the frame 11 in its raised position. In raising the pivoted frame 11, the operating arm grasps the longer arm 28$^c$ of the lever 28 and raises the said arm into the substantially upright position, shown in Figs. 2 and 3 of the drawings, causing its shorter arm 28$^b$ to fulcrum and slide upon the bar 27, whereby the front end of the frame 11 is raised.

Having thus fully described my invention, what I claim as new and desire to secure by Letters Patent, is:—

1. A machine of the class described including a wheeled frame having spaced sides and provided with a transverse supporting bar, a supporting frame pivotally mounted within the wheeled frame and extending forwardly from its pivot and having its front portion loosely arranged upon the transverse supporting bar, soil-engaging devices carried by the pivoted frame and arranged to engage the soil and through their engagement with the same to maintain themselves in working position and hold the pivoted frame against upward movement, and a lever pivoted at an intermediate point to the supporting frame and arranged to bear against and be supported by the said transverse bar for maintaining the supporting frame in an elevated position, said lever being also adapted to fold down against the transverse bar to lower the supporting frame.

2. A machine of the class described including a support, a forked standard depending from the support, a disk mounted within the fork of the standard, a plow located at the side of the disk and having a curved standard connected to the inner side of one of the arms of the forked standard, an inclined brace extending from the outer side of the forked standard to the support, and another inclined brace connected with the first-mentioned inclined brace at an intermediate point of its length, and with the curved standard of the plow below the connection of the first-mentioned brace to the standard.

3. A machine of the class described including a support, a forked standard depending from the support, a disk mounted within the forked standard, a plow arranged at one side of the disk and having a curved standard connected at its upper end to the inner face of the adjacent side of the forked portion of the standard, an upwardly and rearwardly inclined brace secured at its lower end to the outer face of the side of the forked portion of the standard and extending therefrom to the support, and another inclined brace secured at its lower end to the curved standard and connected at its upper end to the first-mentioned inclined brace at a point intermediate of the ends thereof.

4. A machine of the class described including a wheeled frame having spaced sides, an adjustable frame of approximately rectangular form arranged within the wheeled frame and provided at its rear end with a transverse pivot rod connected at its terminals to the sides of the wheeled frame, a front rod extending across the adjustable frame and terminating short of the wheeled frame, a longitudinal support composed of spaced sides and front and rear tubular connecting portions mounted on the said rods, means carried by the wheeled frame for loosely supporting the front end of the adjustable frame, and soil-engaging devices mounted on the adjustable frame in advance of the pivot thereof and arranged through their engagement with the soil to hold the adjustable frame against upward movement.

5. A machine of the class described including a wheeled frame, an adjustable frame pivoted within the wheeled frame and provided with a longitudinal support extending in advance of the pivot and having spaced sides, forked standards depending from the sides of the support, a transverse shaft connecting the standards of the forked portions thereof, spaced disks mounted on the shaft and arranged in the forked portions of the standards, plows located at the sides of the disks and having curved standards connected to the forked standards and arranged through their engagement with the soil to maintain the disks in the ground and to hold the adjustable frame against upward movement, and braces connected with the said standards and with the adjustable frame for holding the former in rigid relation with the latter.

Witness my hand this 19 day of January, 1910.

MANNING L. NIX.

Witnesses:
J. C. ADAMS,
H. C. ADAMS.